(12) United States Patent
Gat

(10) Patent No.: US 10,618,498 B2
(45) Date of Patent: Apr. 14, 2020

(54) SYSTEMS AND METHODS FOR PROVIDING USER ACCESS TO AN AUTONOMOUS VEHICLE

(71) Applicant: UATC, LLC, San Francisco, CA (US)

(72) Inventor: Nimrod Gat, Brooklyn, NY (US)

(73) Assignee: UATC LLC, San Francisco, CA (US)

(*) Notice: Subject to any disclaimer, the term of this patent is extended or adjusted under 35 U.S.C. 154(b) by 26 days.

(21) Appl. No.: 15/661,608

(22) Filed: Jul. 27, 2017

(65) Prior Publication Data

US 2019/0031144 A1 Jan. 31, 2019

(51) Int. Cl.
*B60R 25/25* (2013.01)

(52) U.S. Cl.
CPC .................... *B60R 25/25* (2013.01)

(58) Field of Classification Search
CPC ........... G07C 9/00103; G07C 9/00015; G01C 21/3438; G06Q 10/00; G06Q 10/02; G06Q 10/109; B60R 25/25
See application file for complete search history.

(56) References Cited

U.S. PATENT DOCUMENTS

| | | | |
|---|---|---|---|
| 2014/0292479 A1* | 10/2014 | Ruckart | G07C 9/00103 340/5.52 |
| 2015/0339928 A1 | 11/2015 | Ramanujam | |
| 2017/0155800 A1* | 6/2017 | Nagasawa | G06F 21/32 |
| 2018/0033310 A1* | 2/2018 | Kentley-Klay | G06K 9/00805 |
| 2018/0039917 A1* | 2/2018 | Buttolo | G01C 21/3438 |
| 2018/0188731 A1* | 7/2018 | Matthiesen | B60R 25/24 |
| 2018/0202822 A1* | 7/2018 | DeLizio | G01C 21/3438 |

* cited by examiner

*Primary Examiner* — Nabil H Syed
(74) *Attorney, Agent, or Firm* — Dority & Manning, P.A.

(57) ABSTRACT

Systems and methods are directed to providing controlled user access to an autonomous vehicle. In one example, a computer-implemented method for providing access to an autonomous vehicle includes requesting, by a computing system comprising one or more computing devices, an authentication of a user desiring access to an autonomous vehicle, wherein the authentication of the user is to be performed by a user computing device associated with the user using one or more biometric sensors. The method further includes receiving, by the computing system, user authentication result data indicating that the user authentication was successful; and in response to receiving the user authentication result data indicating that the user authentication was successful, providing, by the computing system, user access data to the autonomous vehicle, wherein the user access data comprises instructions for the autonomous vehicle to perform one or more actions to enable access to the autonomous vehicle.

14 Claims, 9 Drawing Sheets

SYSTEMS AND METHODS FOR PROVIDING USER ACCESS TO AN AUTONOMOUS VEHICLE

FIELD

The present disclosure relates generally to accessing an autonomous vehicle for provision of a service. More particularly, the present disclosure relates to systems and methods that provide controlled user access to an autonomous vehicle associated with a requested service.

BACKGROUND

An autonomous vehicle is a vehicle that is capable of sensing its environment and navigating with little to no human input. In particular, an autonomous vehicle can observe its surrounding environment using a variety of sensors and can attempt to comprehend the environment by performing various processing techniques on data collected by the sensors. This can allow an autonomous vehicle to navigate without human intervention and, in some cases, even omit the use of a human driver altogether. However, the lack of in-person human oversight can potentially reduce the vehicle's security. For instance, a person is unavailable to determine which individuals should be permitted access to the vehicle.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for providing access to an autonomous vehicle. The method includes requesting, by a computing system comprising one or more computing devices, an authentication of a user desiring access to an autonomous vehicle, wherein the authentication of the user is to be performed by a user computing device associated with the user using one or more biometric sensors. The method further includes receiving, by the computing system, user authentication result data indicating that the user authentication was successful. The method further includes, in response to receiving the user authentication result data indicating that the user authentication was successful, providing, by the computing system, user access data to the autonomous vehicle, wherein the user access data comprises instructions for the autonomous vehicle to perform one or more actions to enable access to the autonomous vehicle.

Another example aspect of the present disclosure is directed to a transportation service system. The transportation service system includes an autonomous vehicle which includes one or more vehicle control systems and a vehicle computing system. The vehicle computing system includes one or more processors and one or more memories including instructions that, when executed by the one or more processors, cause the one or more processors to perform operations. The operations include receiving user access data. The operations further include providing one or more control system signals to the one or more vehicle control systems based on the user access data, wherein the one or more control system signals cause the one or more vehicle control systems to perform one or more unlock actions.

Another example aspect of the present disclosure is directed to one or more tangible, non-transitory computer-readable media storing computer-readable instructions that when executed by one or more processors cause the one or more processors to perform operations. The operations include obtaining one or more indications that a user is approaching an autonomous vehicle. The operations further include requesting performance of a user authentication process. The operations further include receiving user authentication result data based on the performance of the user authentication process. The operations further include determining whether the user authentication process was successful based on the user authentication result data. The operations further include providing the user authentication result data to a remote computing system. The operations further include, in response to determining that the user authentication process was not successful, providing error data for display on a user computing device display.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
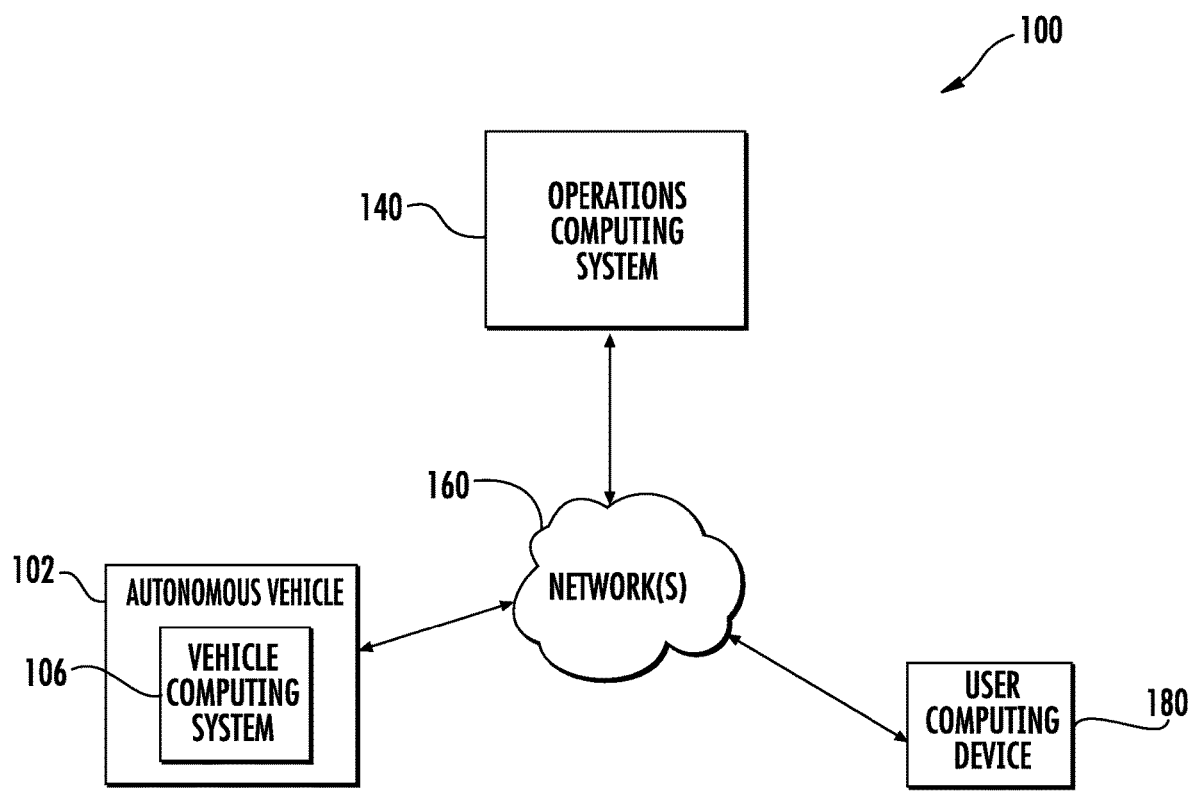
FIG. 1 depicts a block diagram of an example system for providing vehicle services according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to controlling access to an autonomous vehicle. In particular, the systems and methods of the present disclosure can request and receive authentication of a person before providing that person with access to an autonomous vehicle as part of a vehicle service (e.g., requested trip). For example, an entity (e.g., service provider, owner, manager, etc.) can use one or more vehicles (e.g., ground-based vehicles) to provide a vehicle service such as a transportation service (e.g., rideshare service), a courier service, a delivery service, and/or the like to a plurality of users. The vehicles can include, for example, vehicles that operate in an autonomous mode, which allows the vehicle to drive, navigate, operate, etc. with minimal and/or no interaction from a human driver. One or more users (e.g., customers of the entity, etc.) may be provided with access to one of the vehicles as part of the vehicle service. However, the entity may wish to ensure that the intended person (e.g., the "right rider"—the individual who requested the service, individual who the service was requested for, etc.) is provided with access to the autonomous vehicle, for example, when there is no human operator in the vehicle. In addition, the users want to know that they are accessing the right vehicle to proceed with the requested service. To assist in enabling access to an autonomous vehicle to the intended individual (or individuals), an operations computing system of the entity (e.g., a computing system that is associated with an application platform of the entity and/or the like) can generate a user authentication request. The user authentication request can signal a request that one or more users be authenticated, for example, through the use of a biometric sensor associated with a user computing device and/or the like. The operations computing system of the entity can receive a response to the user authentication request, and if the user authentication was successful, can enable access to the autonomous vehicle for the user(s), such as by providing instructions for unlocking the vehicle doors to the autonomous vehicle, for example. In this way, the entity can use biometrics to quickly and securely verify that the intended rider is accessing the autonomous vehicle for the requested service (e.g., getting into the autonomous vehicle to begin the requested trip).

According to an aspect of the present disclosure, a user computing device can be operated by or otherwise associated with an intended user of an autonomous vehicle service. Such user computing device (e.g., a smart phone, a mobile device, a tablet, a laptop computer, a smartwatch or other wearable computing device, etc.) can include one or more biometric sensors (e.g., fingerprint sensor, retina scan sensor, facial recognition sensor, and/or the like) that can provide user authentication services for applications to ensure that the intended user is accessing an application service. As an example, a user computing device (e.g., user computing device operating system or the like) can receive a user authentication request, for example, via a service provider application (e.g. ridesharing application, etc.) installed on the user computing device, to securely authenticate a user using any available biometric sensor included with or otherwise associated with the user computing device. The user computing device (e.g., the device operating system) can perform the authentication process using the biometric sensor and determine if the user being authenticated is the user expected by the service provider application. For instance, an authentication process can include the user computing device providing an authentication request notification (e.g., a textual or graphic prompt or the like) for display to a user on a display device associated with the user computing device; receiving user biometric input via a biometric sensor included with or otherwise associated with the user computing device; evaluating the user biometric input relative to stored user biometric data; and generating a user authentication result (e.g., a successful authentication, a failed authentication).

The user computing device can provide an indication signal to the service provider application of whether the user authentication was successful or the user authentication failed. The service provider application can then enable access for a requested service to the user, such as by enabling the unlocking of an autonomous vehicle of the service provider that is proximate to the user. For example, the service provider application can communicate the user authentication result to one or more remote computing devices of the service provider's application platform (e.g., an operations computing system), and the service provider's application platform can communicate access data or other appropriate information to a particular autonomous vehicle to enable user access to the vehicle (e.g., for the autonomous vehicle to unlock the vehicle doors for the user). Access data can include instructions for a vehicle control system associated with an autonomous vehicle to perform an unlock operation or other action(s). Upon receipt of the access data by a vehicle computing system, the vehicle computing system can provide one or more control command signal(s) to the vehicle control systems to perform the actions to provide the user access to a vehicle in accordance with the access data. For example, the vehicle control systems can control one or more access point(s) of the vehicle. The access point(s) can include features such as the vehicle's doors, trunk, hood, fuel tank access, other mechanical access features that can be actuated between states (e.g., lock and unlocked states), etc. The action(s) can include, for example, changing the state of one or more of the vehicle access point(s) (e.g., from a locked state to an unlocked state).

According to an aspect of the present disclosure, a user's biometric data can be kept private and secure by leveraging the biometric authentication services provided by the user computing device and the user computing device operating system. For instance, the user's biometric data does not need to be shared with the service provider application, the service provider application only needs to be informed of whether the user authentication was successful or failed. Thus, the service provider does not receive access to the user's biometric data (e.g., the actual fingerprint data, retina scan data, facial recognition data, and/or the like), but instead the user's biometric data is kept private and secure by the user computing device.

According to another aspect of the present disclosure, an entity (e.g., service provider, owner, manager) can use one or more vehicles (e.g., ground-based vehicles, air-based vehicles, water-based vehicles, etc.) to provide a vehicle service such as a transportation service (e.g., rideshare service), a courier service, a delivery service, etc. The vehicle(s) can be autonomous vehicles that include various systems and devices configured to control the operation of the vehicle. For example, an autonomous vehicle can include an onboard vehicle computing system for operating the vehicle (e.g., located on or within the autonomous vehicle). The vehicle computing system can receive sensor data from sensor(s) onboard the vehicle (e.g., cameras, LIDAR, RADAR), attempt to comprehend the vehicle's surrounding environment by performing various processing techniques on the sensor data, and generate an appropriate motion plan through the vehicle's surrounding environment. Moreover, the autonomous vehicle can be configured to communicate with one or more computing devices that are remote from the vehicle. For example, the autonomous vehicle can communicate with an operations computing system that can be associated with the entity. The operations computing system can help the entity monitor, communicate with, manage, etc. the fleet of vehicles.

The operations computing system can receive a request for a service (e.g., a trip request) from a user, for example, via an application (e.g., ridesharing application) installed on the user computing device. In response, the operations computing system can deploy an autonomous vehicle to respond to the user's request and provide the requested service (e.g., trip), for example.

In some embodiments, the operations computing system can identify that a user is approaching an autonomous vehicle, for example, via a service provider application installed on the user's device. The operations computing system can request, via the service provider application, for example, that the user computing device verify the user identity using a biometric authentication process provided by the user computing device (e.g., by the user computing device operating system, etc.). The operations computing system can receive, via the service provider application, for example, user authentication result data indicating a result of the biometric authentication process from the user computing device.

If the user authentication result data indicates that the user biometric authentication failed (e.g., the user is not the expected user), the operations computing system can provide one or more error indications to the user, for example, via a graphical user interface display associated with the service provider application on the user computing device. Alternatively, the service provider application on the user computing device can provide the one more error indications to the user.

If the user authentication result data indicates that the user biometric authentication was successful (e.g., the user is the expected user for the autonomous vehicle), the operations computing system can identify the autonomous vehicle associated with a user identifier associated with the user (e.g., the user account identifier for the service provider application or the like), and provide access data to that autonomous vehicle indicating that the user was authenticated and that the autonomous vehicle can provide access (e.g., unlock one or more vehicle doors, access points, etc.) for that user.

For example, in some embodiments, the operations computing system can send access data to a vehicle computing system on-board the autonomous vehicle indicating that a particular user has been authenticated for a service to be provided (e.g., a trip) by that autonomous vehicle. The vehicle computing system can determine one or more actions to be performed by one or more vehicle control systems based on the successful user authentication. For example, the vehicle computing system can provide one or more control signals to the vehicle control system(s) to perform the appropriate action(s), such as unlocking one or more of the vehicle doors or access points so that the user may enter the vehicle and begin the requested service (e.g., trip).

Additionally, in some implementations, the systems and methods of the present disclosure can provide for biometric authentication of remote or third parties (e.g., authentication of individuals other than the user requesting and/or paying for the service). For instance, as an example, a parent may wish to request a trip from a ridesharing service to pick up their child, for example, from school or an event/location where the parent is not present. In such cases, a first person can request the service, for example, via a service provider application on their user computing device, and a second person, the intended rider, can be requested to perform the biometric authentication process to gain access to the autonomous vehicle.

In particular, in some implementations, a first user (e.g., family member, friend, etc.) can request a vehicle service (e.g., a trip request) for a second person, for example, via a service provider application on a first user computing device associated with the first user. When the first user inputs the request for service, they can provide indications that one or more other persons are the intended recipient(s) for the requested service (e.g., the intended rider(s)). The operations computing system of the service provider can provide a notification to a second user computing device associated with the second person(s) and the second person(s) can perform a biometric authentication process via the second user computing device to be granted access to the autonomous vehicle for the trip.

For example, a first user can request a vehicle service indicating the service is for one or more second users. In some implementations, the one or more second users are different than the first user. In some implementations, the one or more second users can include the first user as well as one or more additional second users. The one or more second users can be identified, for example, by selecting the one or more second users designated as intended rider(s) from an address book or contact list stored on a first user computing device associated with the first user. The service provider operations computing system can provide an invitation to one or more second user computing devices associated with the one or more second users, for example, by using a push notification from the service provider application on the second user computing device(s), by sending a text message to the second user computing device(s), and/or the like. The second user(s) (e.g., the intended riders) can accept the invitation and be requested to perform a biometric authentication process to gain access to the autonomous vehicle. As an example, when an intended rider approaches the autonomous vehicle, they can launch the service provider application on their user computing device and perform the biometric authentication process.

Additionally, in some implementations, a service provider can provide a vehicle ride pool service whereby multiple users can participate in at least part of a vehicle trip using a single autonomous vehicle. In such cases, each of the multiple users can be requested to perform their own biometric authentication process via their user computing device before being granted access to the autonomous vehicle (e.g., before having the vehicle door unlocked for each user) to join the vehicle trip.

Additionally, in some implementations, a service provider may wish to control access to an autonomous vehicle for an individual and/or entity that provides maintenance (e.g., engine maintenance) and/or other services (e.g., computing system service, data management) to one or more part(s) of the autonomous vehicle. In such cases, the maintenance/service individual can be requested to perform a biometric authentication process via a user computing device before being granted access to the autonomous vehicle to provide the maintenance/service.

In some implementations, one or more alternative authentication processes may be provided. For instance, in situations where an individual to be authenticated for a service does not have the service provider application installed, an alternate user authentication process can be used to verify the individual before providing access to an autonomous vehicle. Additionally, some user computing devices may not have a biometric sensor or may not provide for biometric authentication; however the service provider may still wish to authenticate the individual before providing access to an autonomous vehicle.

For example, if an individual (e.g., rider) for whom a service has been requested (e.g., the service has been requested by another user such as a family member or friend) does not have access to the service provider application on their user computing device, or if a user computing device associated with the rider does not have a biometric sensor that can provide user authentication services, the operations computing system can provide the rider with a unique code (e.g., an access code) that can be used to authenticate the rider and unlock the autonomous vehicle. For example, the operations computing system can send the unique code (e.g., access code) to the user computing device via a messaging service (e.g., text messaging, email, and/or the like). As one example, after receiving the unique code, the rider can provide the unique code at the autonomous vehicle, such as by entering the code via an input panel provided at or otherwise associated with the autonomous vehicle, and once the code is verified, the autonomous vehicle can perform one or more unlock operations to allow the user to gain access to the vehicle. As another example, in addition to providing the rider with a unique code, the operations computing system can provide a unique mobile website address (e.g., a unique hyperlink, etc.) to the rider, and the rider can navigate to the mobile website via the link to enter the code and be authenticated for access to the autonomous vehicle. While such alternative authentication processes may be less secure than a biometric authentication process, they can be used as an alternative or additional process to verify that an individual is the intended rider before enabling access to the autonomous vehicle for a service when biometric authentication is not feasible.

Additionally, or alternatively, in some implementations, another communication technology or signaling protocol available on a user computing device, such as Bluetooth technology for example, can be used when biometric authentication is not possible (e.g., the user computing device does not have a biometric sensor or does not provide biometric authentication services to applications). As an example, a vehicle computing system associated with an autonomous vehicle can broadcast a specific communication signal (e.g., using Bluetooth Low Energy (BLE)) to locate user computing devices running the service provider application within a defined proximity (e.g. one meter, etc.) of the autonomous vehicle. Using the Bluetooth signal, the vehicle computing system can determine how far a user computing device is from the autonomous vehicle to a very accurate distance. When a user computing device is located within the defined proximity of the autonomous vehicle, the autonomous vehicle can be unlocked for the user.

Additionally, or alternatively, in some implementations, a vehicle computing system associated with the autonomous vehicle can broadcast a Bluetooth signal to locate any user computing devices running the service provider application (e.g., ridesharing application). Once a user computing device running the service provider application is located within a defined proximity of the autonomous vehicle, the vehicle computing system can establish a secure communication connection to the user computing device, before communicating any user identifying data (e.g., a user account identifier, etc.) between the service provider application on the user computing device and the vehicle computing system associated with the autonomous vehicle. The vehicle computing system can communicate with the user computing device over the secure connection to identify and authenticate the user before instructing the autonomous vehicle to unlock for the user. By establishing a secure connection between the vehicle computing system and the user computing device before communicating user identifying data, user identifying data is not broadcast openly and thus cannot be captured by other nearby computing devices.

Additionally, in some implementations, Bluetooth technology can be used to augment the biometric authentication, such as by using Bluetooth technology (e.g., BLE) to determine that a user is within a defined proximity of an autonomous vehicle before requesting the biometric authentication for the user.

In addition, to enhance or improve the user experience, an autonomous vehicle can include one or more displays or indicators (e.g., LED light, display screen, etc.) that can indicate whether an autonomous vehicle has received a valid user authentication. As one example, an autonomous vehicle can be equipped with one or more indicators, such as LED lights on the vehicle door(s). The LED lights can remain in a first state (e.g., a red color) as long as a user has not been authenticated (e.g., while the autonomous vehicle doors are locked before a trip). Once the autonomous vehicle receives an indication signal that the user has been authenticated (e.g., has received a successful authentication indication for the user from the operations computing system), the autonomous vehicle can change the LED lights to a second state (e.g., a green color). The indicator change from a first state to a second state can coincide with the transmission of one or more control signals from a vehicle computing system to perform door unlocking or other action, thus visually indicating to the user that the door has been unlocked and the user can enter the vehicle to begin a service (e.g., a trip).

The systems and methods described herein may provide a number of technical effects and benefits. For instance, by using biometric authentication from user computing devices to identify an intended user, a service provider can quickly and securely ensure that the correct user is being provided with access to the correct autonomous vehicle without requiring additional intervention at the autonomous vehicle. This can allow the vehicle computing system to save computational resources and bandwidth that may otherwise have been needed to provide verification of the user locally at the autonomous vehicle. The vehicle computing system can allocate the saved resources to other functions necessary for operation of the autonomous vehicle, such as object detection, route planning, autonomous navigation, and/or the like.

The systems and methods described herein may also provide a technical effect and benefit of enhancing the user experience while using an autonomous vehicle. For example, the use of biometric authentication can provide the user with the assurance that they are getting into the correct vehicle when a human operator is not present in the vehicle. Additionally, the systems and methods described herein can provide quick and simple authentication of a user, thus speeding the process of accessing the autonomous vehicle and beginning a requested trip.

With reference to the figures, example embodiments of the present disclosure will be discussed in further detail.

FIG. 1 depicts a block diagram of an example system 100 according to example embodiments of the present disclosure. The system 100 can include one or more autonomous vehicle(s) 102, an operations computing system 140, and one or more user computing device(s) 180. The autonomous vehicle(s) 102 and the user computing device(s) 180 can communicate with the operations computing system 140 via one or more network(s) 160. The network(s) 160 can be any type of network or combination of networks that allows for communication between devices and can include various wired and/or wireless communication mechanisms (e.g., cellular, wireless, satellite, microwave, and/or radio frequency) and/or any desired network topology (or topologies). For example, the network(s) 160 can include one or more of a local area network (e.g. intranet), wide area network (e.g. Internet), secure network, wireless LAN network (e.g., via Wi-Fi), cellular network, a SATCOM network, VHF network, a HF network, a WiMAX based network, and/or any other suitable communications network (or combination thereof) for transmitting data to and/or from the autonomous vehicle(s) 102 and/or user computing device(s) 180.

The operations computing system 140 can be associated with a service provider that provides one or more vehicle service(s) to a plurality of users via a fleet of vehicles that includes, for example, the autonomous vehicle 102. The service provider can be an entity that organizes, coordinates, manages, etc. one or more vehicle service(s) for users. The vehicle service(s) can include transportation services (e.g., rideshare services), courier services, delivery services, and/or other types of services. The autonomous vehicle 102 (and other vehicles in the fleet) can be configured to provide the vehicle service(s) to the users. A user can be a user that has downloaded a software application associated with the service provider, a user that has made a service request with the service provider, a user that is a customer of the service provider, a user that has registered with (e.g., signed-up with, has an account with, has a profile with, has subscribed to) the service provider, a current user of the vehicle, a potential user of the vehicle, a user that has been paired with the vehicle, etc. The service provider can coordinate a plurality of vehicles, including the autonomous vehicle 102, to provide the vehicle service(s) to a plurality of users. Such coordination can be performed via the operations computing system 140.

The operations computing system 140 can include multiple components for performing various operations and functions. The operations computing system 140 can receive a request for a vehicle service. For example, a user can operate a user computing device 180 to generate and transmit a service request (e.g., for transportation services) to the operations computing system 140. In some implementations, the user computing device 180 can include a software application associated with the service provider via which the user can provide the request for a vehicle service. In some implementations, the user can interact with a user interface provided by the software application to specify a service type, a vehicle type, one or more location(s) (e.g., origin, destination), etc. and select one or more element(s) to cause the software application to generate and transmit the service request. The operations computing system 140 can identify a vehicle, such as autonomous vehicle 102 for example, to provide the vehicle service requested by the service request and instruct the autonomous vehicle 102 to provide the requested vehicle services.

The operations computing system 140 can further perform various operations and functions as described herein to assist in providing authenticated user access to an autonomous vehicle. In some implementations, for example, the operations computing system 140 can identify that a user is approaching an autonomous vehicle of the service provider (e.g., autonomous vehicle 102). For instance, the operations computing system 140 can receive data from an application platform installed on a user computing device associated with the user (e.g., user computing device 180) indicating that the user computing device 180 is within a certain proximity of an autonomous vehicle (e.g., autonomous vehicle 102).

The operations computing system 140 can request that the user computing device 180 perform a user authentication process, for example, by authenticating the user via one or more biometric sensors included in, or associated with the user computing device 180. As an example, the operations computing system 140 can generate a user authentication request to determine if the user is an expected user (e.g., rider) for a vehicle service to be provided by the autonomous vehicle 102 and provide the request to the user computing device 180 (e.g., the device operating system), for example, via the application platform installed on the user computing device 180. The user computing device 180 can perform the user authentication process, for example, using one or more biometric sensors, and provide the user authentication result data to the operations computing system 140, for example, via the application platform. By requesting the user authentication (e.g., biometric authentication) be performed by the user computing device 180, user biometric data provided by the user can remain private and secure at the user computing device 180 as it is not provided to the operations computing system 140 as part of the user authentication result data.

The operations computing system 140 can determine whether the user associated with the user computing device (e.g., user computing device 180) is the expected user for the vehicle service (e.g., determine that the user authentication by the user computing device 180 was successful). Based on determining that the user authentication was successful, the operations computing system 140 can provide user access data to the autonomous vehicle (e.g., autonomous vehicle 102), where the user access data indicates that the autonomous vehicle should perform one or more actions to allow the user to access the autonomous vehicle, such as unlocking one or more doors of the autonomous vehicle, for example.

The user computing device(s) 180 can include a software application associated with the service provider via which the user can provide a request for a vehicle service and otherwise interact with the service provider, such as through the operations computing system 140.

The user computing device 180 can be configured to display a user interface via a display device and can be configured to receive user input. For example, user input can be provided via interaction with the user interface to generate a service request and interact with the operations computing system 140 during the course of receiving the requested vehicle service. In some implementations, the user computing device 180 can receive a request for user authentication from the operations computing system 140, for example, requesting that biometric authentication of the user be performed by the user computing device 180 to authenticate the user as the expected user for an autonomous vehicle 102. The user computing device 180 (e.g., via the device operating system or the like) can perform one or more authentication processes and provide an authentication result to the operations computing system 140 (e.g., by providing the result to the service provider application installed on the user computing device). In some implementations, the authentication process may include a biometric authentication of the user via one or more biometric sensors included in or associated with the user computing device 180. Additionally, the biometric authentication can be performed at the user computing device 180 without providing any user biometric data to the operations computing system 140 or the service provider application installed on the user computing device 180.

The autonomous vehicle(s) 102 can include a vehicle computing system 106. The vehicle computing system 106 can include various components for performing various operations and functions on-board the autonomous vehicle 102 for operating the vehicle. For example, vehicle computing system 106 can receive sensor data from sensor(s) onboard the vehicle (e.g., cameras, LIDAR, RADAR), attempt to comprehend the vehicle's surrounding environment by performing various processing techniques on the sensor data, and generate an appropriate motion plan through the vehicle's surrounding environment. Moreover, the autonomous vehicle 102 can be configured to communicate with one or more computing devices that are remote from the vehicle, such as, for example, the operations computing system 140 that is associated with the service provider.

For example, in some implementation, the autonomous vehicle 102 can receive information from the operations computing system 140 including requested trip/user data for a vehicle service requested by a user. Additionally, when a user is within a certain proximity of the autonomous vehicle 102, the autonomous vehicle can receive user access data indicating that the user is an expected user for a service to be provided by the autonomous vehicle 102, and the user access data can instruct the autonomous vehicle 102 to provide access for the user, such as by the vehicle computing system 106 providing one or more control signals to one or more control systems of the autonomous vehicle 102 to facilitate user access, for instance by unlocking one or more vehicle doors.

FIG. 1 illustrates one example system 100 that can be used to implement the present disclosure. Other computing systems can be used as well in accordance with the present disclosure.

Figure 2:
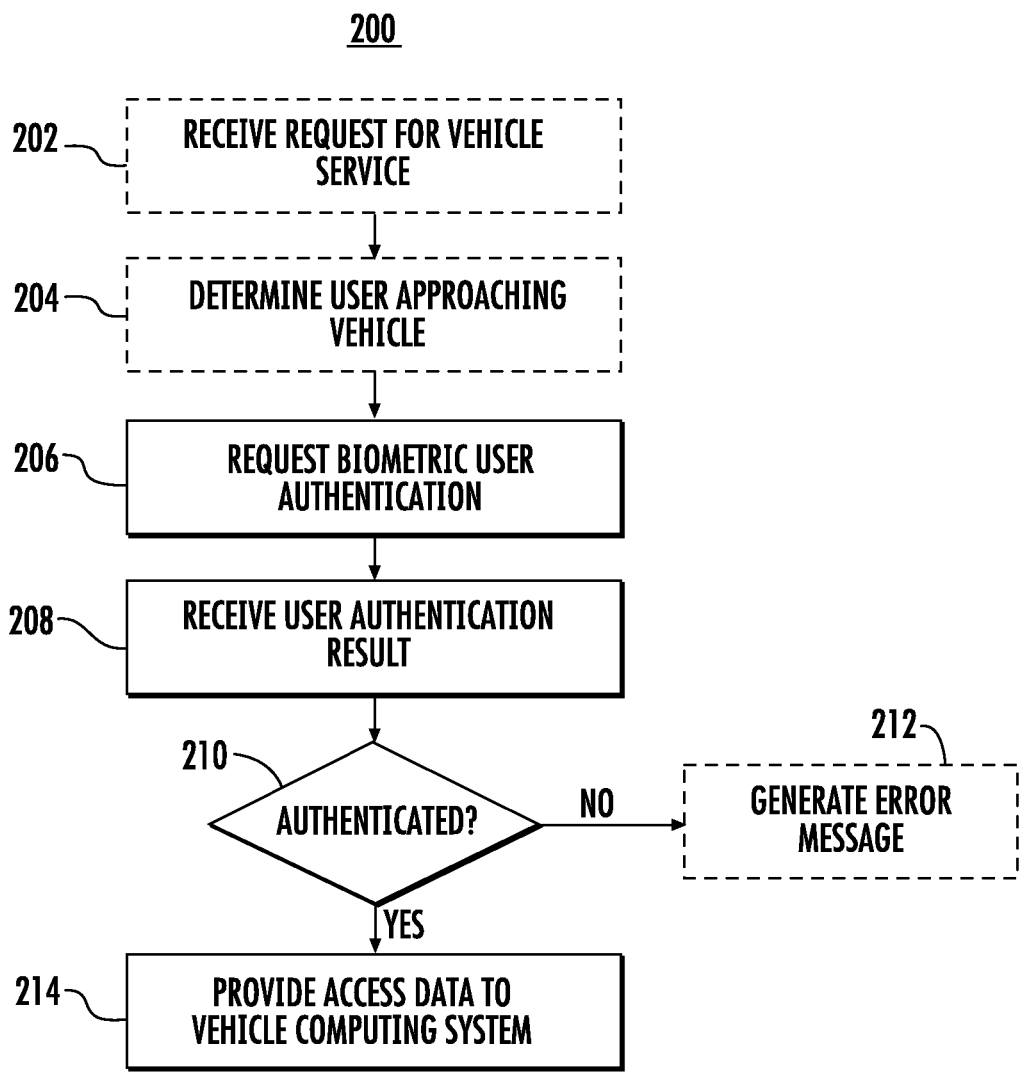
FIG. 2 depicts a flowchart diagram of example operations for providing authenticated user access to an autonomous vehicle according to example embodiments of the present disclosure.

FIG. 2 depicts a flowchart diagram of example operations for providing authenticated user access to an autonomous vehicle according to example embodiments of the present disclosure. One or more portion(s) of the operations 200 can be implemented by one or more computing devices such as, for example, the vehicle computing system 106, the operations computing system 140, and/or the user computing device 180 of FIG. 1, the vehicle computing system 106 of FIG. 5, the computing system 600 of FIG. 6, or the like. Moreover, one or more portion(s) of the operations 200 can be implemented as an algorithm on the hardware components of the device(s) described herein (e.g., as in FIGS. 1, 5, and 6) to, for example, provide authenticated user access to an autonomous vehicle.

At 202, one or more computing devices included within a computing system can optionally receive a request for a vehicle service, for example, from a user of a service provider application installed on a user computing device. For example, in some implementations, the computing system can receive a vehicle service request from a user computing device and provision a vehicle from the service provider's fleet in response to the service request.

At 204, the computing system can optionally determine that a person (e.g., a user of the service provider application platform) is approaching an autonomous vehicle provisioned to provide a requested vehicle service. For example, the computing system can receive one or more indications (e.g., via the service provider application) that a user computing device is approaching or within a certain proximity of an autonomous vehicle provisioned to provide a requested vehicle service.

At 206, the computing system can generate a request for authentication of the approaching person, for example, requesting that a biometric authentication process be performed by a user computing device associated with the user to determine if the user is the expected user (e.g., the user who requested and/or is to receive the vehicle service).

At 208, the computing system can receive user authentication result data, for example, from the user computing device (e.g., via the installed service provider application). As described herein, the user authentication result data received from the user computing device can be provided without providing any user biometric data to the computing system associated with the service provider, and as such, the user biometric data remains private.

At 210, the computing system can determine whether the user authentication result data indicates that the user authentication was successful (e.g., the user is an expected user for the autonomous vehicle service), and if the user authentication was successful, operation can proceed to 214. If the user authentication result data indicates that the user authentication failed, operation can proceed to 212.

At 212, upon determining at 210 that the user authentication failed, in some implementations, the computing system can optionally generate an error dialogue which can be provided to the user, for example, using a service provider application installed on the user computing device.

At 214, upon determining at 210 that the user authentication was successful, the computing system can generate access data indicating that the user is authorized to access the autonomous vehicle for the requested service. The computing system can then provide the access data to the autonomous vehicle. The access data can comprise data indicating that the autonomous vehicle can provide access to the vehicle for the user, such as by providing control signals to one or more vehicle control systems to enable vehicle access, for example, by unlocking one or more vehicle doors.

Figure 3:
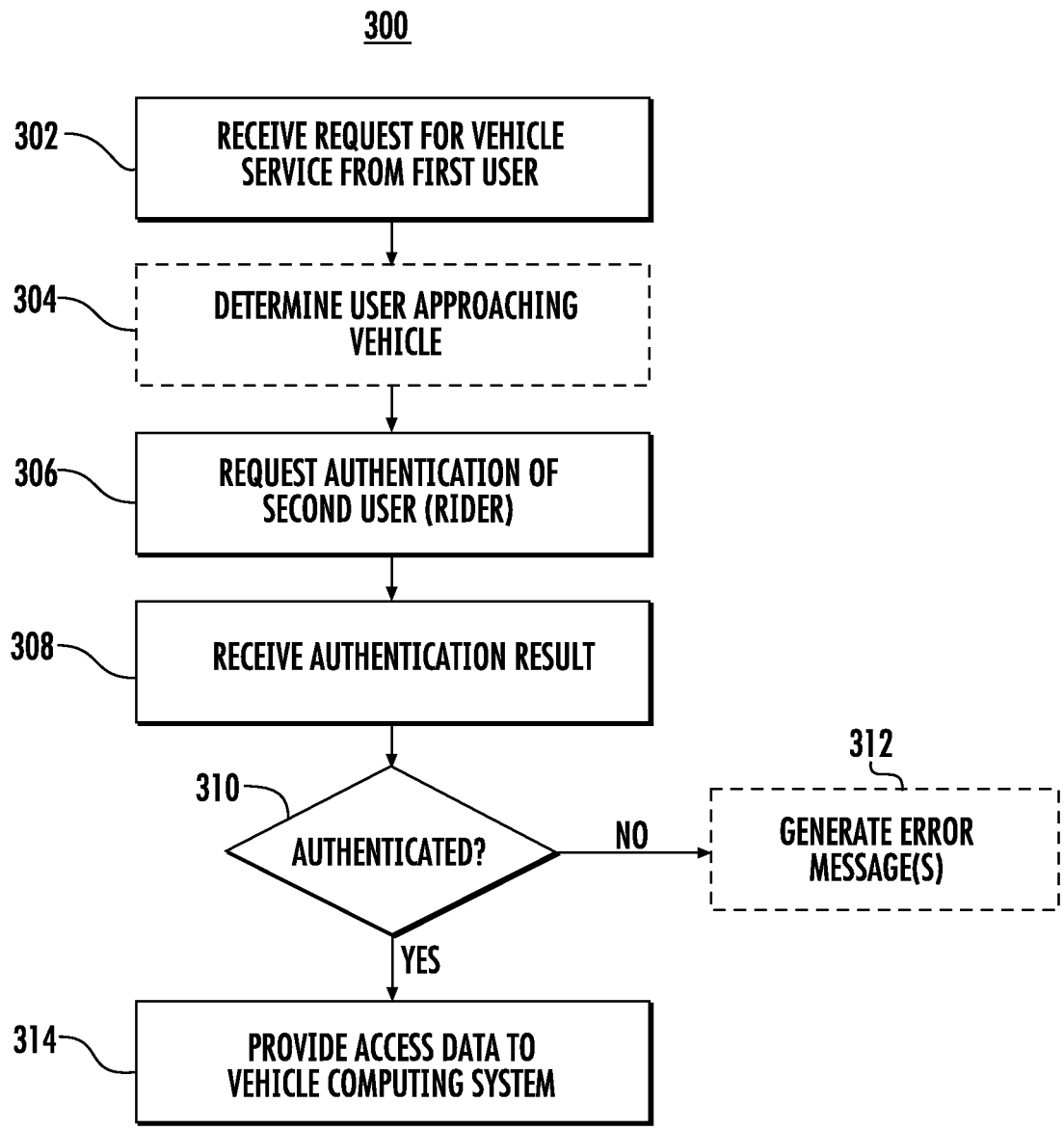
FIG. 3 depicts a flowchart diagram of example operations for providing authenticated third-party access to an autonomous vehicle according to example embodiments of the present disclosure.

FIG. 3 depicts a flowchart diagram of example operations 300 for providing authenticated third-party access to an autonomous vehicle according to example embodiments of the present disclosure. One or more portion(s) of the operations 300 can be implemented by one or more computing devices such as, for example, the vehicle computing system 106, the operations computing system 140, and/or the user computing device 180 of FIG. 1, the vehicle computing system 106 of FIG. 5, the computing system 600 of FIG. 6, or the like. Moreover, one or more portion(s) of the operations 300 can be implemented as an algorithm on the hardware components of the device(s) described herein (e.g., as in FIGS. 1, 5, and 6) to, for example, provide authenticated user access to an autonomous vehicle.

At 302, one or more computing devices included within a computing system can obtain a request from a first user of a service provider, for example, via a service provider application installed on a first user computing device, for a vehicle service to be provided to one or more second users.

At 304, the computing system can optionally determine that a person (e.g., potential rider) is approaching an autonomous vehicle provisioned to provide a requested vehicle service to the one or more second users. For example, the computing system can receive one or more indications that a second user computing device is approaching or within certain proximity of an autonomous vehicle provisioned to provide a requested vehicle service (e.g., via a service provider application installed on the user computing device).

At 306, the computing system can generate a request for authentication of the approaching person, for example, requesting that a biometric authentication process be performed by the second user computing device associated with the person to determine if the person is the one or more expected second users.

At 308, the computing system can receive user authentication result data, for example, from the second user computing device. As described herein, the user authentication result data received from the user computing device can be provided without providing any user biometric data to a computing system associated with the service provider.

At 310, the computing system can determine whether the user authentication result data indicates that the user authentication was successful (e.g., the approaching person is one of the one or more expected second users), and if the user authentication was successful, operation can proceed to 314. If the user authentication result data indicates that the user authentication failed, operation can proceed to 312.

At 312, upon determining at 310 that the user authentication failed, in some implementations, the computing system can optionally generate one or more error dialogues which can be provided to the user(s), for example, using a service provider application installed on a user computing device (e.g., the second user computing device). In some implementations, an error dialogue indicating that the user authentication failed may be provided to the first user (e.g., provided to the first user computing device), to the second user (e.g., provided to the second user computing device), or to both the first user and the second user (e.g., provided to the first user computing device and the second user computing device).

At 314, upon determining at 310 that the user authentication was successful, the computing system can generate access data indicating that the second user is authorized to access the autonomous vehicle for the requested service. The computing system can then provide the access data to the autonomous vehicle to facilitate user access to the vehicle. The access data can comprise data indicating that the autonomous vehicle should provide access to the vehicle for the user, such as by providing control signals to one or more vehicle control systems to enable vehicle access, for example, by unlocking one or more vehicle doors.

Figure 4:
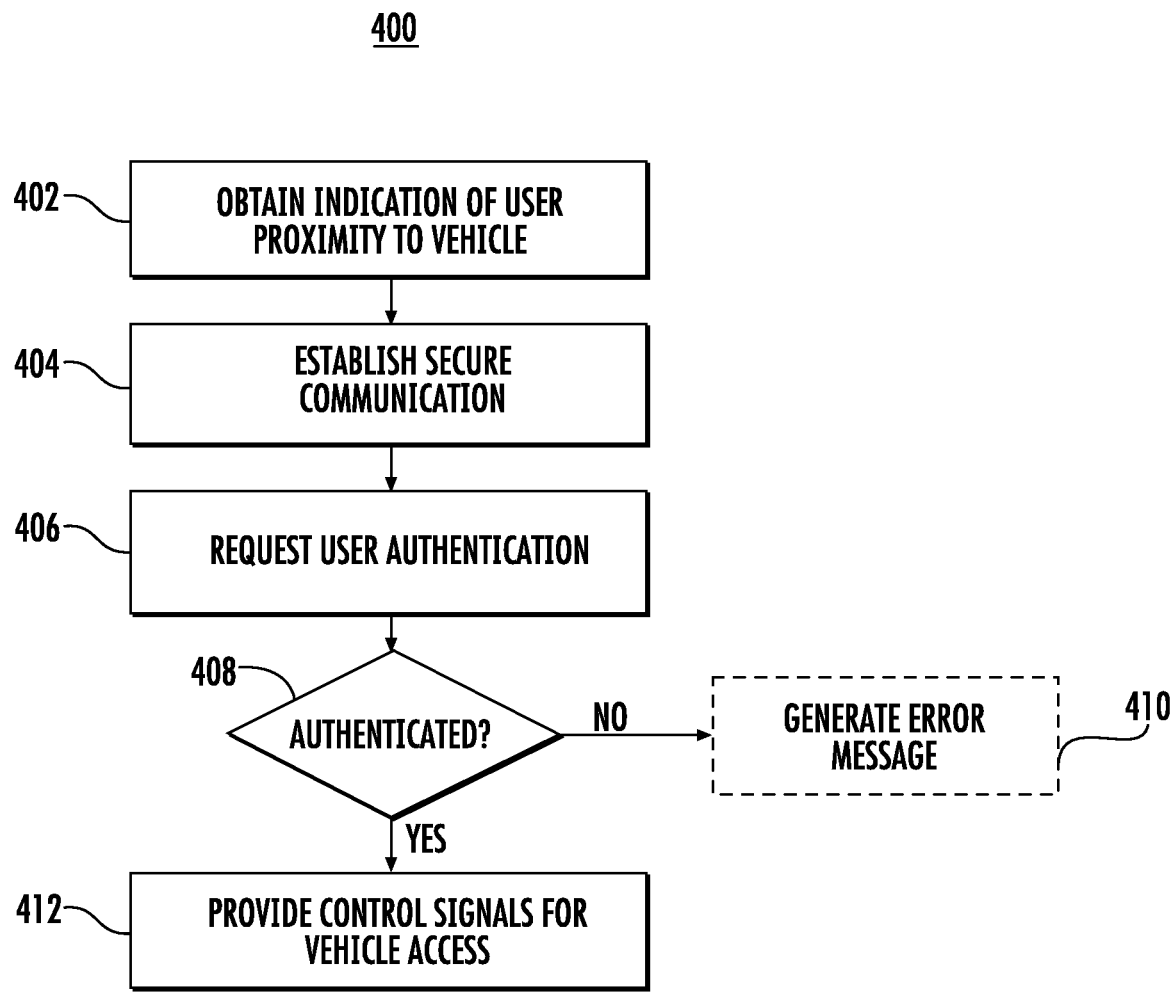
FIG. 4 depicts a flowchart diagram of example operations for providing authenticated user access to an autonomous vehicle according to example embodiments of the present disclosure.

FIG. 4 depicts a flowchart diagram of example operations 400 for providing authenticated user access to an autonomous vehicle according to example embodiments of the present disclosure. One or more portion(s) of the operations 400 can be implemented by one or more computing devices such as, for example, the vehicle computing system 106, the operations computing system 140, and/or the user computing device 180 of FIG. 1, the vehicle computing system 106 of FIG. 5, the computing system 600 of FIG. 6, or the like. Moreover, one or more portion(s) of the operations 400 can be implemented as an algorithm on the hardware components of the device(s) described herein (e.g., as in FIGS. 1, 5, and 6) to, for example, provide authenticated user access to an autonomous vehicle.

At 402, one or more computing devices included within a computing system can obtain one or more indications that a user is approaching or is proximate to an autonomous vehicle that has been provisioned to provide a vehicle service, for example, indicating that a user computing device associated with the user is within a certain distance of the autonomous vehicle.

At 404, the computing system can request and establish a secure connection with the user computing device, for example, via a service provider application installed on the user computing device.

At 406, the computing system can generate a request for authentication of the approaching user, for example, requesting that user identifying data (e.g., user data associated with a service provider user account) be transmitted from the user computing device via the secure connection.

At 408, the computing system can determine whether the user authentication based on the user identifying data was successful (e.g., the user is an expected user), and if the user authentication was successful, operation can proceed to 412. If the user authentication failed, operation can proceed to 410.

At 410, upon determining at 408 that the user authentication failed, in some implementations, the computing system can optionally generate an error dialogue which can be provided to the user, for example, using the service provider application installed on the user computing device.

At 412, upon determining at 408 that the user authentication was successful, the computing system can provide one or more control signals to provide access to the autonomous vehicle. For instance, the one or more control signals can indicate to one or more vehicle control systems to facilitate vehicle access, such as by unlocking one or more vehicle doors.

Figure 5:
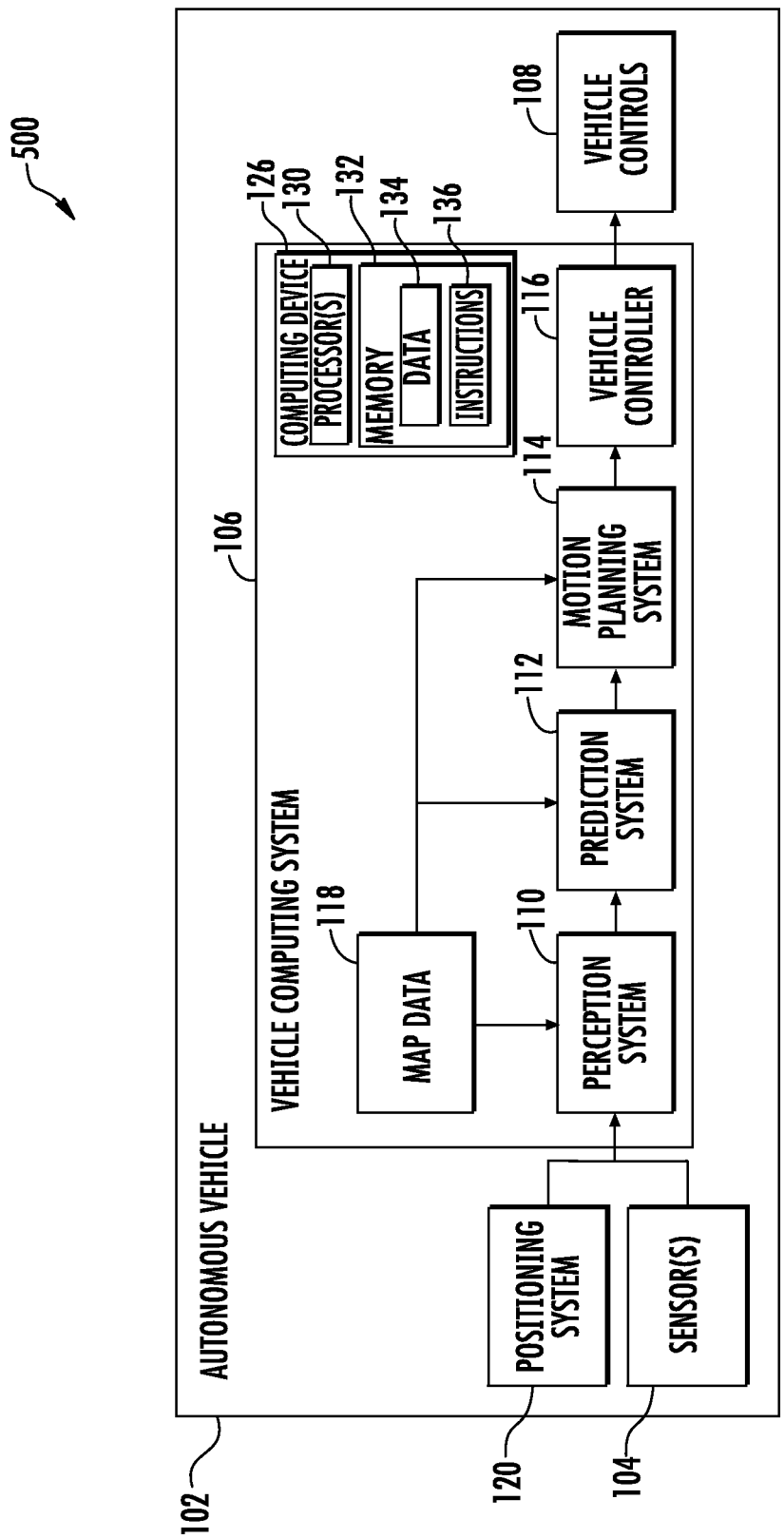
FIG. 5 depicts a block diagram of an example system for controlling operation of an autonomous vehicle according to example embodiments of the present disclosure.

FIG. 5 depicts a block diagram of an example system 500 for controlling the navigation of an autonomous vehicle 102 according to example embodiments of the present disclosure. The autonomous vehicle 102 is capable of sensing its environment and navigating with little to no human input. The autonomous vehicle 102 can be a ground-based autonomous vehicle (e.g., car, truck, bus, etc.), an air-based autonomous vehicle (e.g., airplane, drone, helicopter, or other aircraft), or other types of vehicles (e.g., watercraft). The autonomous vehicle 102 can be configured to operate in one or more modes, for example, a fully autonomous operational mode and/or a semi-autonomous operational mode. A fully autonomous (e.g., self-driving) operational mode can be one in which the autonomous vehicle can provide driving and navigational operation with minimal and/or no interaction from a human driver present in the vehicle. A semi-autonomous (e.g., driver-assisted) operational mode can be one in which the autonomous vehicle operates with some interaction from a human driver present in the vehicle.

The autonomous vehicle 102 can include one or more sensors 104, a vehicle computing system 106, and one or more vehicle controls 108. The vehicle computing system 106 can assist in controlling the autonomous vehicle 102. In particular, the vehicle computing system 106 can receive sensor data from the one or more sensors 104, attempt to comprehend the surrounding environment by performing various processing techniques on data collected by the sensors 104, and generate an appropriate motion path through such surrounding environment. The vehicle computing system 106 can control the one or more vehicle controls 108 to operate the autonomous vehicle 102 according to the motion path.

The vehicle computing system 106 can include one or more processors 130 and at least one memory 132. The one or more processors 130 can be any suitable processing device (e.g., a processor core, a microprocessor, an ASIC, a FPGA, a controller, a microcontroller, etc.) and can be one processor or a plurality of processors that are operatively connected. The memory 132 can include one or more non-transitory computer-readable storage mediums, such as RAM, ROM, EEPROM, EPROM, flash memory devices, magnetic disks, etc., and combinations thereof. The memory 132 can store data 134 and instructions 136 which are executed by the processor 130 to cause vehicle computing system 106 to perform operations. In some implementations, the one or more processors 130 and at least one memory 132 may be comprised in one or more computing devices, such as computing device(s) 126, within the vehicle computing system 106.

In some implementations, vehicle computing system 106 can further be connected to, or include, a positioning system 120. Positioning system 120 can determine a current geographic location of the autonomous vehicle 102. The positioning system 120 can be any device or circuitry for analyzing the position of the autonomous vehicle 102. For example, the positioning system 120 can determine actual or relative position by using a satellite navigation positioning system (e.g. a GPS system, a Galileo positioning system, the GLObal NAvigation Satellite System (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position. The position of the autonomous vehicle 102 can be used by various systems of the vehicle computing system 106.

As illustrated in FIG. 5, in some embodiments, the vehicle computing system 106 can include a perception system 110, a prediction system 112, and a motion planning system 114 that cooperate to perceive the surrounding environment of the autonomous vehicle 102 and determine a motion plan for controlling the motion of the autonomous vehicle 102 accordingly.

In particular, in some implementations, the perception system 110 can receive sensor data from the one or more sensors 104 that are coupled to or otherwise included within the autonomous vehicle 102. As examples, the one or more sensors 104 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 102.

As one example, for LIDAR system, the sensor data can include the location (e.g., in three-dimensional space relative to the LIDAR system) of a number of points that correspond to objects that have reflected a ranging laser. For example, LIDAR system can measure distances by measuring the Time of Flight (TOF) that it takes a short laser pulse to travel from the sensor to an object and back, calculating the distance from the known speed of light.

As another example, for RADAR system, the sensor data can include the location (e.g., in three-dimensional space relative to RADAR system) of a number of points that correspond to objects that have reflected a ranging radio wave. For example, radio waves (pulsed or continuous) transmitted by the RADAR system can reflect off an object and return to a receiver of the RADAR system, giving information about the object's location and speed. Thus, RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

Thus, the one or more sensors 104 can be used to collect sensor data that includes information that describes the location (e.g., in three-dimensional space relative to the autonomous vehicle 102) of points that correspond to objects within the surrounding environment of the autonomous vehicle 102.

In addition to the sensor data, the perception system 110 can retrieve or otherwise obtain map data 118 that provides detailed information about the surrounding environment of the autonomous vehicle 102. The map data 118 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 106 in comprehending and perceiving its surrounding environment and its relationship thereto.

The perception system 110 can identify one or more objects that are proximate to the autonomous vehicle 102 based on sensor data received from the one or more sensors 104 and/or the map data 118. In particular, in some implementations, the perception system 110 can determine, for each object, state data that describes a current state of such object. As examples, the state data for each object can describe an estimate of the object's: current location (also referred to as position); current speed; current heading (also referred to together as velocity); current acceleration; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 110 can determine state data for each object over a number of iterations. In particular, the perception system 110 can update the state data for each object at each iteration. Thus, the perception system 110 can detect and track objects (e.g., vehicles, pedestrians, bicycles, and the like) that are proximate to the autonomous vehicle 102 over time.

The prediction system 112 can receive the state data from the perception system 110 and predict one or more future locations for each object based on such state data. For example, the prediction system 112 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 114 can determine a motion plan for the autonomous vehicle 102 based at least in part on the predicted one or more future locations for the object provided by the prediction system 112 and/or the state data for the object provided by the perception system 110. Stated differently, given information about the current locations of objects and/or predicted future locations of proximate objects, the motion planning system 114 can determine a motion plan for the autonomous vehicle 102 that best navigates the autonomous vehicle 102 relative to the objects at such locations.

As one example, in some implementations, the motion planning system 114 can determine a cost function for each of one or more candidate motion plans for the autonomous vehicle 102 based at least in part on the current locations and/or predicted future locations of the objects. For example, the cost function can describe a cost (e.g., over time) of adhering to a particular candidate motion plan. For example, the cost described by a cost function can increase when the autonomous vehicle 102 approaches a possible impact with another object and/or deviates from a preferred pathway (e.g., a preapproved pathway).

Thus, given information about the current locations and/or predicted future locations of objects, the motion planning system 114 can determine a cost of adhering to a particular candidate pathway. The motion planning system 114 can select or determine a motion plan for the autonomous vehicle 102 based at least in part on the cost function(s). For example, the candidate motion plan that minimizes the cost function can be selected or otherwise determined. The motion planning system 114 can provide the selected motion plan to a vehicle controller 116 that controls one or more vehicle controls 108 (e.g., actuators or other devices that control gas flow, acceleration, steering, braking, etc.) to execute the selected motion plan.

Each of the perception system 110, the prediction system 112, and the motion planning system 114 can include computer logic utilized to provide desired functionality. In some implementations, each of the perception system 110, the prediction system 112, and the motion planning system 114 can be implemented in hardware, firmware, and/or software controlling a general purpose processor. For example, in some implementations, each of the perception system 110, the prediction system 112, and the motion planning system 114 includes program files stored on a storage device, loaded into a memory, and executed by one or more processors. In other implementations, each of the perception system 110, the prediction system 112, and the motion planning system 114 includes one or more sets of computer-executable instructions that are stored in a tangible computer-readable storage medium such as RAM hard disk or optical or magnetic media.

Figure 6:
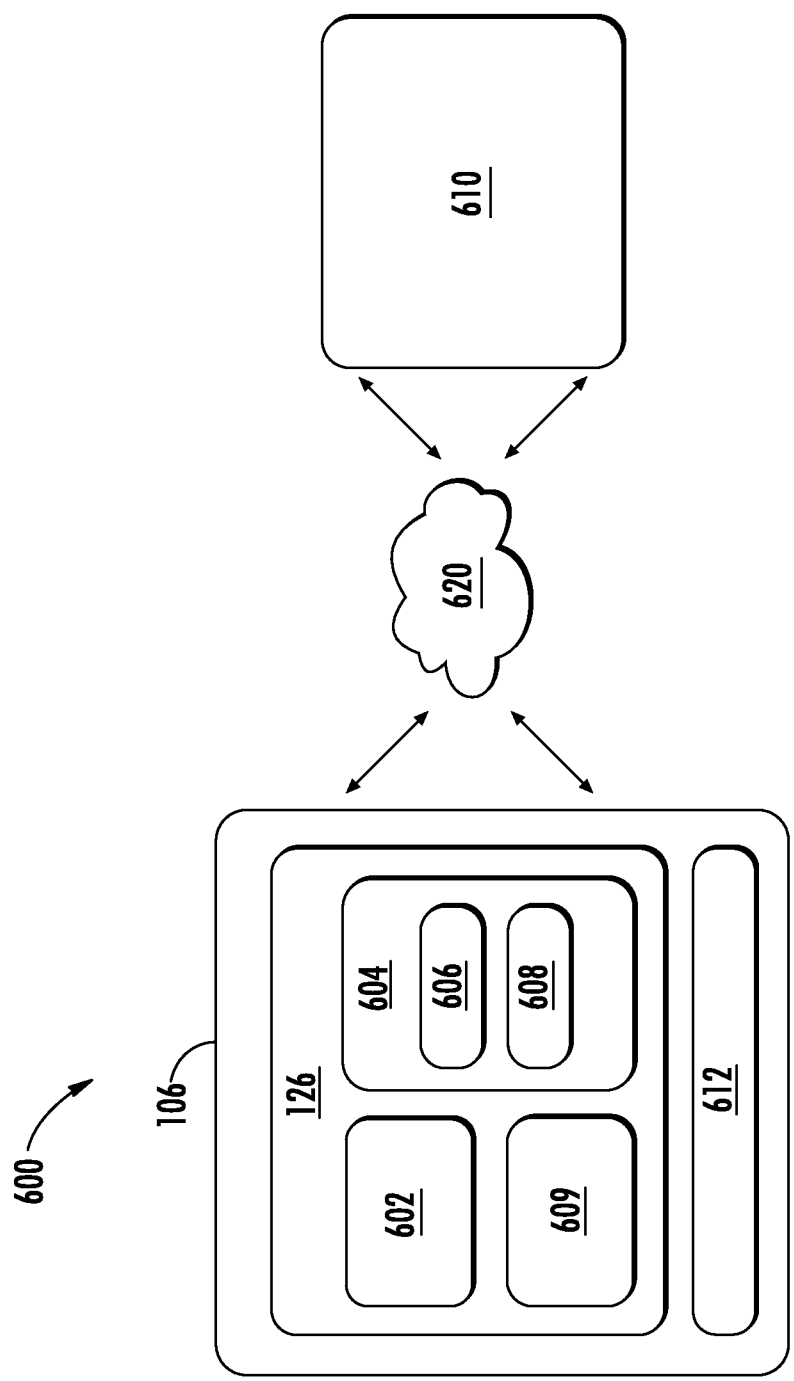
FIG. 6 depicts a block diagram of an example computing system according to example embodiments of the present disclosure.

FIG. 6 depicts an example computing system 600 according to example embodiments of the present disclosure. The example computing system 600 illustrated in FIG. 6 is provided as an example only. The components, systems, connections, and/or other aspects illustrated in FIG. 6 are optional and are provided as examples of what is possible, but not required, to implement the present disclosure. The example computing system 600 can include the vehicle computing system 106 of the autonomous vehicle 102 and, in some implementations, a remote computing system 610 including remote computing device(s) that is remote from the autonomous vehicle 102 (e.g., the operations computing system 140) that can be communicatively coupled to one another over one or more networks 620. The remote computing system 610 can be associated with a central operations system and/or an entity associated with the autonomous vehicle 102 such as, for example, a vehicle owner, vehicle manager, fleet operator, service provider, etc.

The computing device(s) 126 of the vehicle computing system 106 can include processor(s) 602 and a memory 604. The one or more processors 602 can be any suitable processing device (e.g., a processor core, a microprocessor, an ASIC, a FPGA, a controller, a microcontroller, etc.) and can be one processor or a plurality of processors that are operatively connected. The memory 604 can include one or more non-transitory computer-readable storage media, such as RAM, ROM, EEPROM, EPROM, one or more memory devices, flash memory devices, etc., and combinations thereof.

The memory 604 can store information that can be accessed by the one or more processors 602. For instance, the memory 604 (e.g., one or more non-transitory computer-readable storage mediums, memory devices) on-board the autonomous vehicle 102 can include computer-readable instructions 606 that can be executed by the one or more processors 602. The instructions 606 can be software written in any suitable programming language or can be implemented in hardware. Additionally, or alternatively, the instructions 606 can be executed in logically and/or virtually separate threads on processor(s) 602.

For example, the memory 604 on-board the autonomous vehicle 102 can store instructions 606 that when executed by the one or more processors 602 on-board the autonomous vehicle 102 cause the one or more processors 602 (the vehicle computing system 106) to perform operations such as any of the operations and functions of the computing device(s) 126 or for which the computing device(s) 126 are configured, as described herein including, for example, operations of FIGS. 2-4, and 8.

The memory 604 can store data 608 that can be obtained, received, accessed, written, manipulated, created, and/or stored. The data 608 can include, for instance, sensor data, map data, data identifying detected objects including current object states and predicted object locations and/or trajectories, service request data (e.g., trip and/or user data), motion plans, etc., as described herein. In some implementations, the computing device(s) 126 can obtain data from one or more memory device(s) that are remote from the autonomous vehicle 102.

The computing device(s) 126 can also include a communication interface 609 used to communicate with one or more other system(s) on-board the autonomous vehicle 102 and/or a remote computing device that is remote from the autonomous vehicle 102 (e.g., of remote computing system 610). The communication interface 609 can include any circuits, components, software, etc. for communicating with one or more networks (e.g., 620). In some implementations, the communication interface 609 can include for example, one or more of a communications controller, receiver, transceiver, transmitter, port, conductors, software, and/or hardware for communicating data.

In some implementations, the vehicle computing system 106 can further include a positioning system 612. The positioning system 612 can determine a current position of the autonomous vehicle 102. The positioning system 612 can be any device or circuitry for analyzing the position of the autonomous vehicle 102. For example, the positioning system 612 can determine position by using one or more of inertial sensors, a satellite positioning system, based on IP address, by using triangulation and/or proximity to network access points or other network components (e.g., cellular towers, WiFi access points, etc.) and/or other suitable techniques. The position of the autonomous vehicle 102 can be used by various systems of the vehicle computing system 106.

The network(s) 620 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 620 can be accomplished, for instance, via a communication interface using any type of protocol, protection scheme, encoding, format, packaging, etc.

The remote computing system 610 can include one or more remote computing devices that are remote from the vehicle computing system 106. The remote computing devices can include components (e.g., processor(s), memory, instructions, data, etc.) similar to that described herein for the computing device(s) 126. Moreover, the remote computing system 610 can be configured to perform one or more operations of the operations computing system 140, as described herein.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Figure 7:
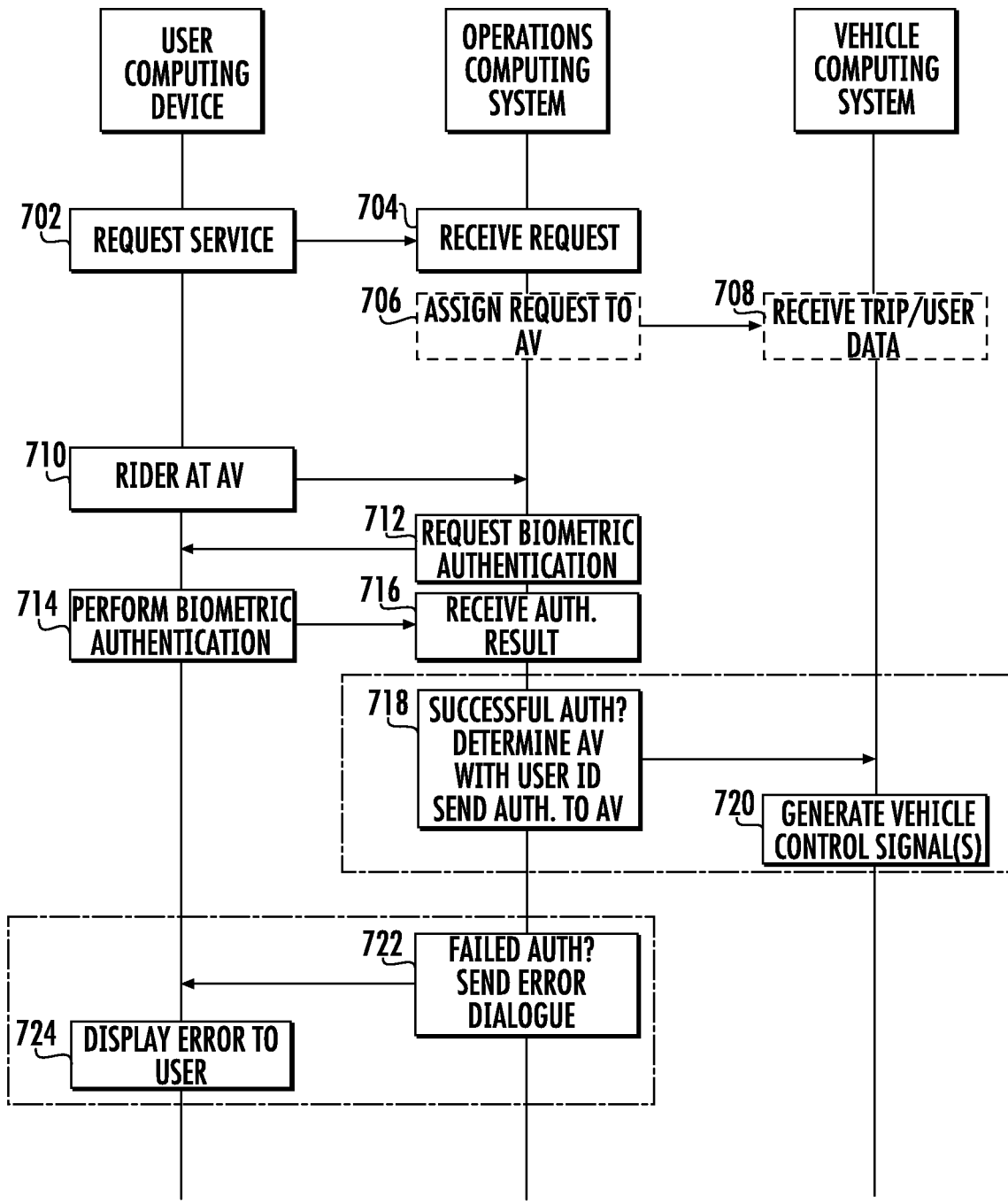
FIG. 7 depicts a data flow diagram of example operations for providing authenticated user access to an autonomous vehicle according to example embodiments of the present disclosure.

FIG. 7 depicts a data flow diagram of example operations 700 for providing authenticated user access to an autonomous vehicle according to example embodiments of the present disclosure. For example, in some implementations, providing authenticated user access to an autonomous vehicle may comprise communications among one or more user computing devices (e.g., user computing device 180 of FIG. 1 or the like), an operations computing system (e.g., operations computing system 140 of FIG. 1, computing system 610 of FIG. 6, or the like), and/or a vehicle computing system (e.g., vehicle computing system 106 of FIG. 1, FIG. 5, or FIG. 6 or the like).

At 702, a user computing device can generate a request for a vehicle service, for example, based on user input in a service provider application installed on the user computing device. The user computing device can then provide the request for a vehicle service to an operations computing system associated with the service provider.

At 704, the operations computing system associated with the service provider can receive a request for a vehicle service from a user computing device. The operations computing system associated with the service provider may then generate requested vehicle service data based on the request for a vehicle service and determine a vehicle from a service provider fleet that can be provisioned to provide the vehicle service.

At 706, the operations computing system associated with the service provider can assign the request for a vehicle service to an autonomous vehicle within the service provider fleet based on the vehicle service data, as determined at 704, and provide the requested vehicle service data to the autonomous vehicle, for example, to a vehicle computing system associated with the autonomous vehicle (e.g., on-board the autonomous vehicle).

At 708, a vehicle computing system of an autonomous vehicle can receive requested vehicle service data (e.g., comprising data regarding the user and the requested service) from an operations computing system. The vehicle computing system can then generate a motion plan for providing the requested vehicle service and implement the motion plan.

At 710, the user computing device can determine that the user computing device is approaching an autonomous vehicle, for example, using the service provider application installed on the user computing device. The service provider application can provide one or more indications that the user is approaching an autonomous vehicle associated with the service provider to the operations computing system.

At 712, the operations computing system can generate a request for authentication of the user, such as biometric authentication of the user, and provide the request to the user computing device, for example, via the service provider application. For instance, the operations computing system can generate a request to authenticate the user as an expected user for a requested vehicle service.

At 714, the user computing device (e.g., device operating system) can perform the biometric user authentication, using one or more biometric sensors associated with the user computing device. The user computing device can then generate user authentication result data indicating whether the user authentication was successful (e.g., whether the user is the expected user for the autonomous vehicle service). The user computing device can then provide the user authentication result data to the operations computing system, for example, via the service provider application. The user computing device can generate and provide the user authentication result data without including any user biometric data in the authentication result data.

At 716, the operations computing system can receive the authentication result data from the user computing device.

At 718, the operations computing system can determine, based on the authentication result data, that the user is an expected user of the requested vehicle service to be provided by the autonomous vehicle and send user access data to the autonomous vehicle provisioned to provide the requested service (e.g., the autonomous vehicle having the user ID/trip data for the requested service).

At 720, the vehicle computing system associated with the autonomous vehicle can provide one or more control signals to one or more vehicle control systems to enable user access to the autonomous vehicle, for example, causing one or more vehicle doors to be unlocked.

Alternatively, at 722, the operations computing system can determine, based on the authentication result data, that the user is not an expected user of the requested vehicle service to be provided by the autonomous vehicle. The operations computing system can optionally generate an error dialogue and provide the error dialogue to the user computing device.

At 724, the user computing device can provide for display of an error message to the user based on a failed user authentication (e.g., the user is not the expected user of the autonomous vehicle service), for example, via the service provider application.

Figure 8:
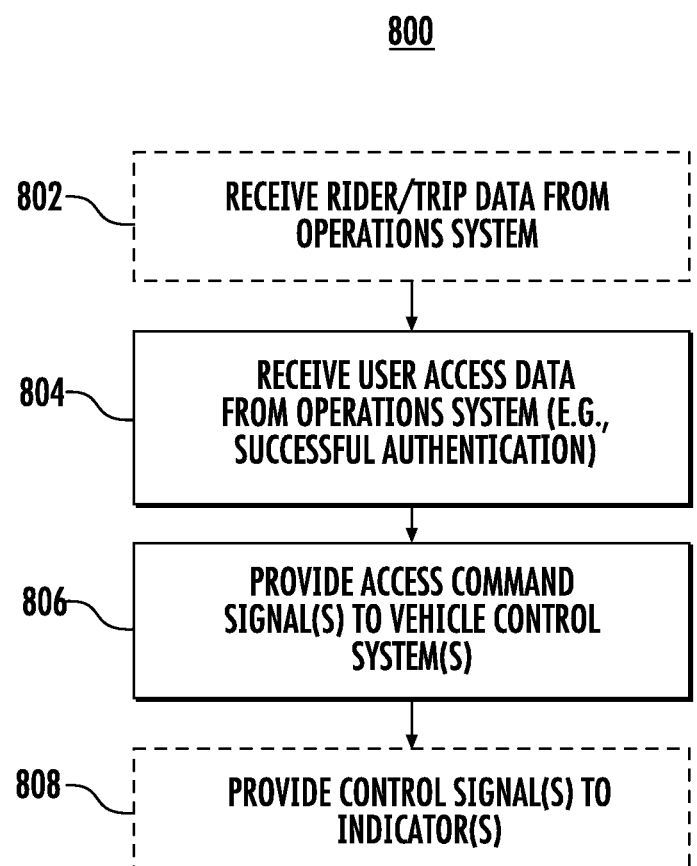
FIG. 8 depicts a flowchart diagram of example operations for providing authenticated user access at an autonomous vehicle according to example embodiments of the present disclosure.

FIG. 8 depicts a flowchart diagram of example operations 800 for providing authenticated user access at an autonomous vehicle according to example embodiments of the present disclosure. One or more portion(s) of the operations 800 can be implemented by one or more computing devices such as, for example, the vehicle computing system 106 of FIG. 1, the vehicle computing system 106 of FIG. 5, the vehicle computing system 106 of FIG. 6, and/or the like. Moreover, one or more portion(s) of the operations 800 can be implemented as an algorithm on the hardware components of the device(s) described herein (e.g., as in FIGS. 1, 5, and 6) to, for example, provide authenticated user access to an autonomous vehicle.

At 802, one or more computing devices included within a computing system, such as a vehicle computing system for example, can optionally obtain rider and/or trip request data for an autonomous vehicle, for example, from a service provider operations computing system.

At 804, the computing system can receive user access data from the operations computing system, for example, indicating that an approaching user is an expected user for a vehicle service for which the autonomous vehicle has been provisioned.

At 806, the computing system can provide one or more control signals to one or more vehicle controls to facilitate user access to the autonomous vehicle, for example, by unlocking one or more vehicle doors.

At 808, the computing system can optionally provide one or more control signals to one or more vehicle indicator displays. For example, the one or more control signals can cause a vehicle indicator display to change state to indicate that the user can access the vehicle (e.g., a door has been unlocked), such as by changing an LED indicator from a red color to a green color.

Figure 9:
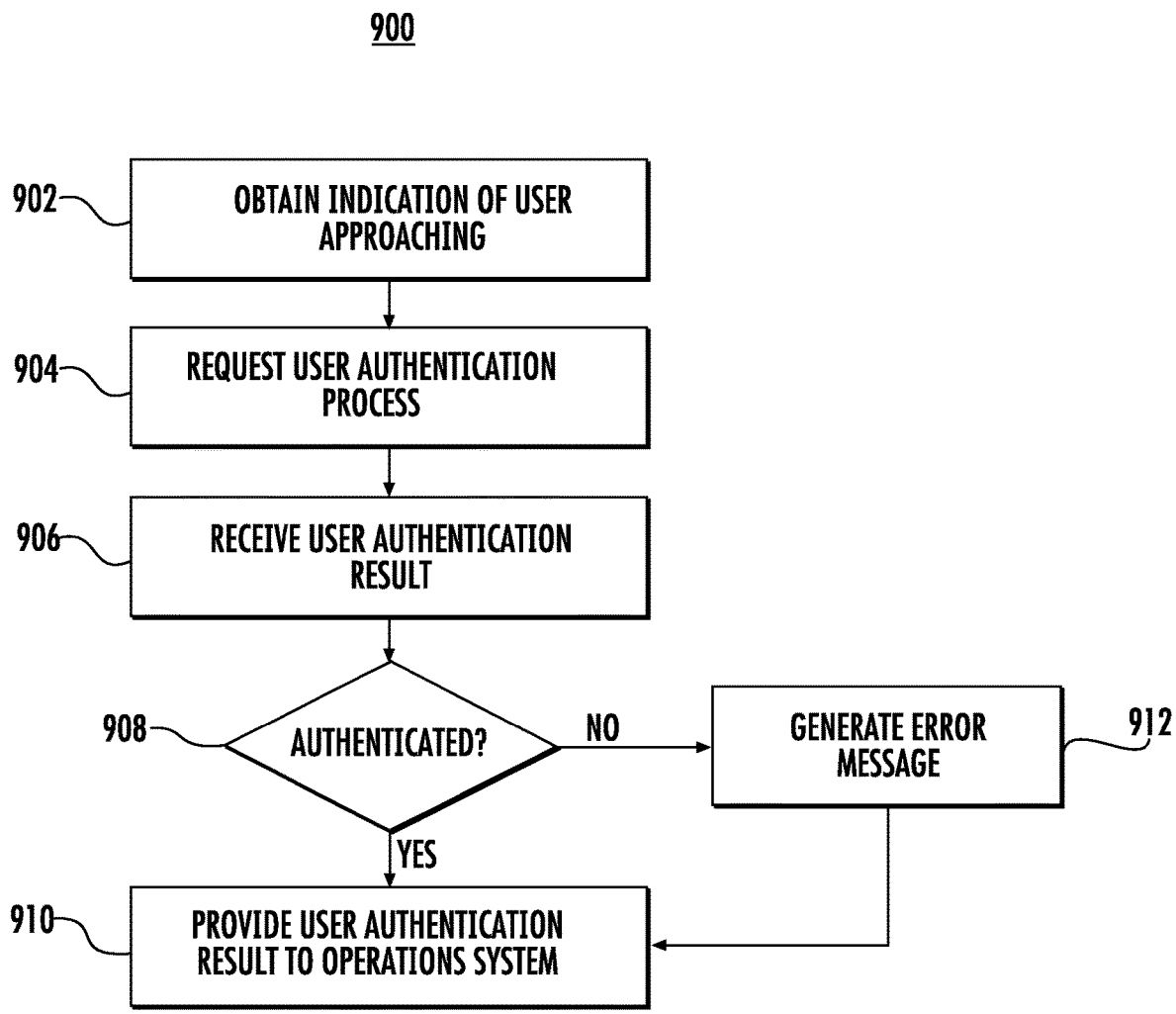
FIG. 9 depicts a flowchart diagram of example operations for providing authenticated user access to an autonomous vehicle according to example embodiments of the present disclosure.

FIG. 9 depicts a flowchart diagram of example operations 900 for providing authenticated user access to an autonomous vehicle according to example embodiments of the present disclosure. One or more portion(s) of the operations 900 can be implemented by one or more computing devices such as, for example, the user computing device 180 of FIG. 1, and/or the like. Moreover, one or more portion(s) of the operations 900 can be implemented as an algorithm on the hardware components of the device(s) described herein (e.g., as in FIGS. 1, 5, and 6) to, for example, provide authenticated user access to an autonomous vehicle.

At 902, an application associated with one or more computing devices included within a computing system (e.g., a service provider application installed on the computing system) can obtain one or more indications that a user of the computing system is approaching an autonomous vehicle provisioned for a vehicle service.

At 904, the computing system application can provide a request to the computing system (e.g., user computing device operating system) for authentication of the user of the computing system to determine if the user is the expected user for the autonomous vehicle.

At 906, the computing system application can receive user authentication result data from the computing system (e.g., user computing device operating system). As described herein, the user authentication result data can be provided to the application without including any user biometric data.

At 908, the computing system application can determine whether the user authentication result data indicates that the user authentication was successful (e.g., the user is the expected user), and if the user authentication was successful, operation can proceed to 910. If the user authentication result data indicates that the user authentication failed, operation can proceed to 912.

At 910, upon determining at 908 that the user authentication was successful, the computing system application can provide the user authentication result data to an operations computing system associated with the application, such that the operations computing system can facilitate user access to the autonomous vehicle (e.g., by sending access data to the autonomous vehicle to permit access).

At 912, upon receiving an indication that the user authentication failed, the computing system application can generate error data which can be provided to the user, for example, via a display of the computing system. At 914, the computing system application can then provide the user authentication result data to the operations computing system associated with the application.

Although FIGS. 2-4, 8, and 9 depict steps performed in a particular order for purposes of illustration and discussion, the methods of the present disclosure are not limited to the particularly illustrated order or arrangement. The various steps of the methods 200, 300, 400, 800, and 900 can be omitted, rearranged, combined, and/or adapted in various ways without deviating from the scope of the present disclosure.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for providing access to an autonomous vehicle comprising:

receiving, by a computing system comprising one or more computing devices, a user request for a vehicle service from a first user computing device associated with a first user, the user request comprising an indication of one or more second users for intended participation in the vehicle service;

providing, by the computing system, data associated with a requested service to an assigned autonomous vehicle, wherein the computing system is a remote system separate from the assigned autonomous vehicle;

determining that one or more second user computing devices associated with the one or more second users are within a defined proximity to the assigned autonomous vehicle;

transmitting, by the computing system in response to determining that the one or more second user computing devices are within the defined proximity to the assigned autonomous vehicle, one or more authentication requests from the computing system to the one or more second user computing devices, wherein authentication of the one or more second users is to be performed by the one or more second user computing devices using one or more biometric sensors;

receiving, by the computing system from the one or more second user computing devices, user authentication result data indicating that the authentication of the one or more second users was successful, wherein the user authentication result data does not include any biometric data associated with the one or more second users;

in response to receiving the user authentication result data indicating that the authentication of the one or more second users was successful, determining, by the computing system, that the one or more second users are associated with the requested service; and in response to determining that the authentication of the one or more second users is associated with the requested service, providing, by the computing system, user access data to the assigned autonomous vehicle, wherein the user access data comprises instructions for the assigned autonomous vehicle to perform one or more actions to enable access to the assigned autonomous vehicle by the one or more second users.

2. The computer-implemented method of claim 1, further comprising obtaining, by the computing system, one or more indications that the one or more second users are approaching the assigned autonomous vehicle.

3. The computer-implemented method of claim 2, wherein the one or more indications indicate that the one or more second user computing devices are within the defined proximity to the assigned autonomous vehicle.

4. The computer-implemented method of claim 1 wherein the user authentication result data comprises data indicating that the one or more second users are not a requesting user.

5. The computer-implemented method of claim 1, further comprising:
providing, by the computing system, an invitation for the vehicle service to the one or more second user computing devices associated with each of the one or more second users;
wherein the user authentication result data comprises data indicating that the one or more second users desire access to the assigned autonomous vehicle.

6. The computer-implemented method of claim 1, wherein the user access data comprises instructions for the assigned autonomous vehicle to perform an unlock operation.

7. A transportation service system comprising:
an autonomous vehicle; and
a remote computing system separate from the autonomous vehicle; the remote computing system comprising:
one or more processors; and
one or more memories including instructions that, when executed by the one or more processors, cause the one or more processors to perform operations, the operations comprising:
transmitting, from the remote computing system to the autonomous vehicle, data associated with a requested service based on a user request for vehicle service, the user request being from a first user computing device associated with a first user and comprising an indication of one or more second users for intended participation in the vehicle service;
determining that one or more second user computing devices associated with the one or more second users are within a defined proximity to the autonomous vehicle;
transmitting, from the remote computing system in response to determining that the one more second user computing devices are within the defined proximity to the autonomous vehicle, one or more authentication requests to the one more second user computing devices, wherein authentication of the one or more second users is to be performed by the one or more second user computing devices using one or more biometric sensors;
receiving, by the remote computing system from the one or more second user computing devices, user authentication result data indicating that the authentication of the one or more second users was successful, wherein the user authentication result data does not include any biometric data associated with the one or more second users;
in response to receiving the user authentication result data indicating that the authentication of the one or more second users was successful, determining, by the remote computing system, that the one or more second users are associated with the requested service for the autonomous vehicle; and
in response to determining that the authentication of the one or more second users is associated with the requested service for the autonomous vehicle, providing, by the remote computing system, user access data to the autonomous vehicle, wherein the user access data comprises instructions for the autonomous vehicle to perform one or more unlock actions to enable access to the autonomous vehicle by the one or more second users.

8. The transportation service system of claim 7, wherein the user access data comprises an access code and the operations further comprising:
determining whether the access code is associated with the one or more second users; and
providing one or more control system signals to one or more vehicle control systems based on the determination that the access code is associated with the one or more second users.

9. The transportation service system of claim 7, wherein the user access data comprises one or more indications that at least one of the one or more second user computing devices is within the defined proximity of the autonomous vehicle and the operations further comprising:
determining whether the at least one of the one or more second user computing devices is associated with the requested service; and
providing one or more control system signals to the one or more vehicle control systems when the at least one of the one or more second user computing devices is determined to be associated with the requested service.

10. The transportation service system of claim 9, wherein the one or more indications that the at least one of the one or more second user computing devices is within the defined proximity of the autonomous vehicle are based on a communication signaling protocol.

11. The transportation service system of claim 7, the operations further comprising:
providing a control signal to one or more indicator displays associated with the autonomous vehicle, the control signal causing the one or more indicator displays to indicate that the one or more unlock actions have been performed.

12. One or more tangible, non-transitory computer-readable media storing computer-readable instructions that when executed by one or more processors cause the one or more processors to perform operations, the operations comprising:
transmitting, from a computing system to an assigned autonomous vehicle, data associated with a requested service based on a user request for vehicle service, the user request being from a first user computing device associated with a first user and comprising an indication of one or more second users for intended participation in the vehicle service, wherein the computing system is a remote system separate from the assigned autonomous vehicle;

determining that one or more second user computing devices associated with the one or more second users are within a defined proximity to the assigned autonomous vehicle;

transmitting, from the computing system in response to determining that the one more second user computing devices are within the defined proximity to the assigned autonomous vehicle, one or more authentication requests to the one or more second computing devices, wherein authentication of the one or more second users is to be performed by the one or more second user computing devices using one or more biometric sensors associated with the one or more second user computing devices;

receiving, by the computing system from the one or more second computing devices, user authentication result data, wherein the user authentication result data does not include any biometric data associated with the one or more second users;

in response to receiving the user authentication result data indicating that the authentication of the one or more second users was successful, determining, by the computing system, that the one or more second users are associated with the requested service for the assigned autonomous vehicle; and in response to determining that the authentication of the one or more second users is associated with the requested service for the assigned autonomous vehicle, providing, by the remote computing system, user access data to the assigned autonomous vehicle, wherein the user access data comprises instructions for the assigned autonomous vehicle to enable access to the assigned autonomous vehicle by the one or more second users.

13. The one or more tangible, non-transitory computer-readable media of claim 12, further comprising obtaining one or more indications that at least one of the one or more second computing devices is within the defined proximity to the autonomous vehicle.

14. The one or more tangible, non-transitory computer-readable media of claim 12, wherein the computing system is an operations computing system configured to relay user access data to the assigned autonomous vehicle when the user authentication result data is successful.

* * * * *